United States Patent [19]

Scharstuhl

[11] Patent Number: 5,895,573
[45] Date of Patent: *Apr. 20, 1999

[54] ULTRAFILTRATION DEVICE FOR DOMESTIC/DRINKING WATER PURIFICATION

[75] Inventor: Johan Jan Scharstuhl, TC AMBT Delden, Netherlands

[73] Assignee: Prime Water Systems N.V., Willemstad Curacao, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/735,146

[22] Filed: Oct. 22, 1996

[30] Foreign Application Priority Data

Oct. 7, 1996 [NL] Netherlands .................. 1004210

[51] Int. Cl.⁶ .................................................. B01D 63/02
[52] U.S. Cl. ............................ 210/321.87; 210/500.23
[58] Field of Search ........................ 210/257.2, 282, 210/321.78, 321.79, 321.8, 321.81, 321.87, 321.88, 321.89, 321.9, 416.3, 500.23

[56] References Cited

U.S. PATENT DOCUMENTS

| | | | |
|---|---|---|---|
| 4,636,307 | 1/1987 | Inoue | 210/321.87 |
| 4,798,672 | 1/1989 | Knight | 210/282 |
| 4,971,185 | 11/1990 | Taylor | 210/321.89 |
| 4,995,976 | 2/1991 | Vermes | 210/282 |
| 5,019,252 | 5/1991 | Kamei | 210/282 |
| 5,037,547 | 8/1991 | Burrow | 210/282 |
| 5,045,198 | 9/1991 | Norton | 210/321.87 |
| 5,100,555 | 3/1992 | Matson | 210/321.87 |
| 5,139,668 | 8/1992 | Pan | 210/321.8 |
| 5,151,191 | 9/1992 | Sunaoka | 210/321.8 |
| 5,156,335 | 10/1992 | Smith | 210/282 |
| 5,160,038 | 11/1992 | Harada | 210/282 |
| 5,173,178 | 12/1992 | Kawashima | 210/85 |
| 5,221,473 | 6/1993 | Burrows | 210/282 |
| 5,225,079 | 7/1993 | Saito | 210/321.8 |
| 5,240,862 | 8/1993 | Koenhen | 436/178 |
| 5,290,443 | 3/1994 | Norton | 210/500.23 |
| 5,518,613 | 5/1996 | Koczur | 210/282 |
| 5,560,828 | 10/1996 | Wenten | 210/651 |

OTHER PUBLICATIONS

A.P.M. van Oudheusden et al., "A multilayer membrane system for blood plasma isolation for use in primary health care", *Ann Clin Biochem 1991*, 28: pp. 55–59.

*Primary Examiner*—Ernest G. Therkorn
*Attorney, Agent, or Firm*—Darby & Darby

[57] ABSTRACT

Disclosed is an ultrafiltration device for domestic water supply which removes microorganisms and organic contamination. The device includes a bundle of capillary ultrafiltration membranes fitted in a filter housing, whereby the capillary membranes are open at a first end and closed at another end and are at the first end held in a membrane holder, which closes off the space in between the capillary membranes and the filter housing.

7 Claims, 1 Drawing Sheet

ULTRAFILTRATION DEVICE FOR DOMESTIC/DRINKING WATER PURIFICATION

FIELD OF THE INVENTION

The present invention relates to an ultrafiltration device for cleaning of liquids, more specifically to an ultrafiltration device for cleaning of water for domestic use, especially drinking water.

BACKGROUND OF THE INVENTION

Devices for cleaning of liquids, and more specifically for cleaning of drinking water and for removing of live micro-organisms from the drinking water are known in the art. The installations which are used for the purification of drinking water for an extensive area usually have a large size. Outdated techniques or obselete installations are often used and it is therefore not easy to obtain an adequate purification of drinking water. It is also possible that pathogenes or other sorts of contamination appear in water that was purified earlier. To prevent the appearance of health threatening pathogenes, chlorine is often added to the drinking water. This has the important disadvantage of a strong deterioration of the taste and smell of the water. Moreover, a number of micro-organisms, like Cryptosporidium and Giardia, are resistent to chlorine and remain live organisms in the chlorinated drinking water. Furthermore, it is a problem that in a lot of areas, especially in third world countries, no reliable drinking water supply is present at all.

OBJECTS AND DESCRIPTION OF THE INVENTION

It is an object of the present invention to provide an ultrafiltration device which can be used in or at a water supply outlet, like the flow tube of a mixing tap, or at another point in the domestic water supply mains and which further is suitable for removing micro-organisms and organic contamination. For this reason the device includes a filter housing comprising an inlet and outlet connection and a bundle of capillary ultrafiltration membranes fitted in the filter housing, whereby the capillary membranes are open at a first end and closed at another end and are at the first end held in a membrane holder, which closes off the space in between the capillary membranes and the filter housing. The device according to the invention effectively filters particles and molecules, which are larger than the pore diameter of the ultrafiltration membranes, from the liquids to be purified. Furthermore, the ultrafiltration membranes form an absolute barrier for bacteria and viruses. A typical log removal value for micro-organisms lies above 5.8, while a log removal value of 1.7–3.8 is required according to the United States Environmental Protection Agency.

It is preferred that the ultrafiltration device comprises a carbon filter, so that organic molecules, which might pass the ultrafiltration membranes, will be removed.

In a preferred embodiment, the carbon filter is formed as a flow-through housing containing granulated activated carbon. In this flow-through configuration in which the granulated activated carbon is contained in a separate housing, the surface to volume ratio of the granulated activated carbon can be implemented such that the effect of the device is optimized.

In a further preferred embodiment of the ultrafiltration device according to the invention, the carbon filter is positioned between the inlet connection and the bundle of capillary membranes. In still a further preferred embodiment of the ultrafiltration device, the carbon filter is positioned between the bundle of capillary ultrafiltration membranes and the outlet connection. In still a further preferred embodiment, the capillary membranes are fitted in the flow-through housing for the liquid to be cleaned, which contains the granulated activated carbon.

It is preferred to use capillary ultrafiltration membranes having an asymmetric pore structure. In this way the filtration characteristics of the membrane are improved.

In a preferred embodiment the pore structure is asymmetric in such a way that the pore diameter decreases in the flow direction of the liquid flow through the membrane wall. This liquid flow can pass from the inside to the outside through the membrane wall, as well as from the outside to the inside. This will result in a further improvement of the filtration characteristics, a slowing-down of the contamination of the membrane material and the device can be easily cleaned to be used again.

By fitting the bundle of capillary membranes spirally around a support in the filter housing, the active membrane filtration surface can be increased in the interior of a certain filter housing and, consequently, the device can made smaller for a desired filter capacity.

BRIEF DESCRIPTION OF THE DRAWING

The invention will in the following be further explained with the aid of the accompanying drawing, in which.

DETAILED DESCRIPTION OF PREFERRED EMBODIMENTS

Figure 1:
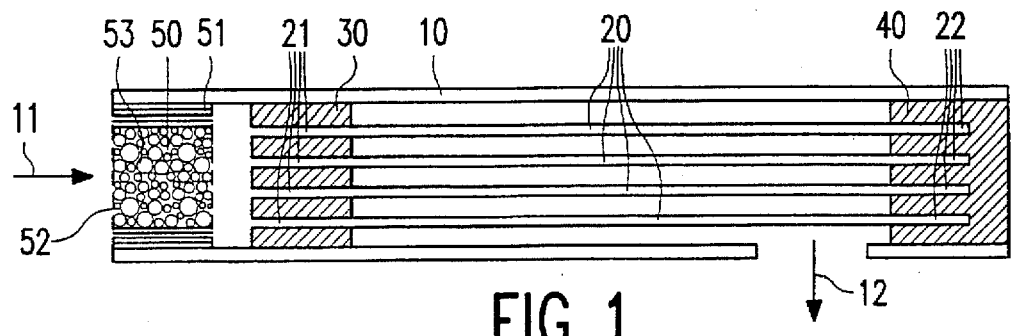
FIG. 1 shows a first preferred embodiment of the ultrafiltration device according to the invention, in which the carbon filter is positioned between the inlet connection and the capillary membranes.

In the figures identical reference numerals refer to like parts.

Figure 2:
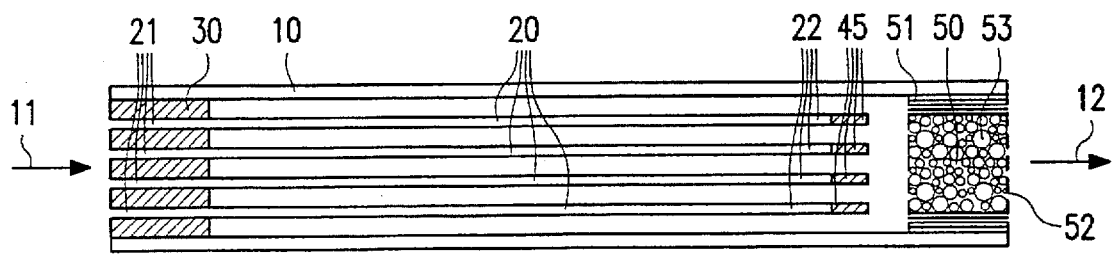
FIG. 2 shows a second preferred embodiment of the ultrafiltration device according to the invention, in which the carbon filter is positioned between the capillary membranes and the outlet connection.
Figure 3:
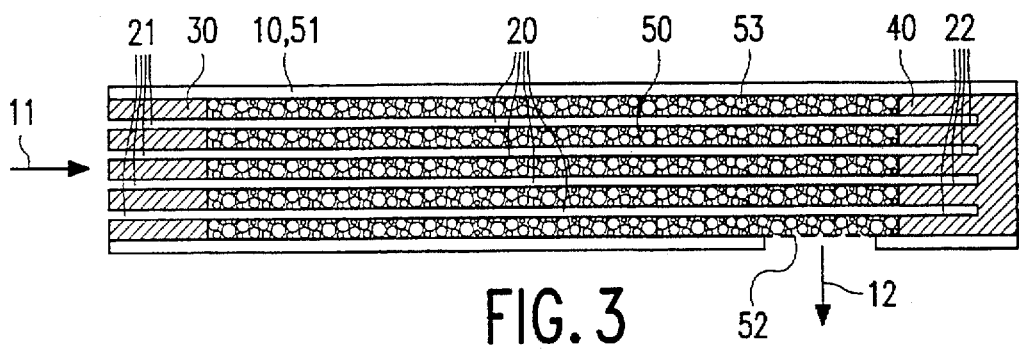
FIG. 3 shows a third preferred embodiment of the inventive ultrafiltration device according to the invention, in which the capillary membranes are fitted in the housing of the carbon filter.

In the FIGS. 1, 2 and 3 the filter housing is refered to by reference numeral 10. The filter housing 10 includes an inlet connection which is refered to by 11, and an outlet connection, which is refered to by 12. A bundle of capillary ultrafiltration membranes 20 is fitted in the filter housing 10 and are held in a filter holder 30 at a first end 21. At this first end 21 the capillary membranes are open. At the other end 22 the capillary membranes are closed. The filter housing 10 can be made of a rigid material, like P.V.C. or a metal, but it can also be produced of a flexible material. In the latter case the ultrafiltration device can be used in a bend position.

In a first preferred embodiment, shown in FIG. 1, the membranes 20 are at both sides embedded in a resin, like epoxy or polyurethane. In the preferred embodiment shown in FIG. 1, the filter housing 10 consists of a tubular element, in which an opening 12 is located between the resin plugs 30, 40 which are located close to the ends, which opening 12 serves as the outlet connection.

In a second preferred embodiment, shown in FIG. 2, the capillary membranes 20 are separately closed with a resin plug 45. In this embodiment the filter housing 10 also consists of a tubular element, but the outlet connection 12 is located in line with the inlet connection 11.

A carbon filter 50 is arranged in the filter housing 10. This filter is formed with granulated activated carbon, which is put in a flow-through housing 51. Organic contamination solved in water which might pass the capillary ultrafiltration membranes 20 is removed by the carbon filter 50. The carbon filter 50 can be located at several positions in the filter housing 10. In a preferred embodiment, shown in FIG. 1, the carbon filter 50 is positioned between the inlet connection 11 and the membrane holder 30. The flow-through housing 51 is fitted in the filter holder 10 such that the water which is flowing from the inlet connection 11 can only reach the capillary membranes 20 through the carbon filter 50. To keep the granulated activated carbon 53 in the flow-through housing 51, the housing 51 is closed at both ends by a perforated plate 52.

In another preferred embodiment, shown in FIG. 2, the carbon filter 50 is positioned between the capillary membranes 20 and the outlet connection 12. In this embodiment the water to be purified first passes the membranes and subsequently flows through the carbon filter 50 and leaves the device via the outlet connection 12.

In still another preferred embodiment, shown in FIG. 3, the capillary membranes 20 are fitted in the housing of the carbon filter 50. The filter housing 10 serves in this embodiment also as the flow-through housing 51 of the carbon filter 50. The granulated activated carbon is in this case located in between the capillary membranes 20. The outlet connection 12 is in this preferred embodiment positioned between the resin plugs 30, 40 which are located close to the ends of the filter housing 10 and the outlet connection 12 is closed off by a perforated plate 52 to keep the granulated activated carbon in the flow-through housing 51.

The pores of the capillary membranes have an asymmetric structure, the pore diameter decreasing in the flow direction of the liquid flow, that is with the larger pores at the inside of the capillary membranes of the embodiments shown in FIGS. 1, 2 and 3. Because of the asymmetric structure, the filtration characteristics are considerably better than those of a membrane having only a symmetric pore structure. Due to this and because of the permanent hydrophilic properties of the membrane material, the membranes are not easily saturated with contamination. Because of the asymmetric structure of the pores, the capillary membranes can be cleaned excellently after a period of use and then be re-used. In the embodiments shown, the pores have a diameter of about 10 μm at the inside of the capillary membranes and at the outside a diameter of about 20 nm. Particles with a size larger than 20 nm are in this way very effectively filtered from the drinking water to be purified. It is preferred to use ultrafiltration membranes of the company X-Flow BV, Almelo, The Netherlands. These membranes satisfy the desired filtration criteria and have a low contamination affinity. Moreover, these membranes can be used very well at temperatures ranging from 0–120° C.

The ultrafiltration device is preferably used in or at a water supply point, like a mixing tap. A mixing tap usually supplies 10 liters of water per minute, for which a membrane surface of about 0.1 m² is required. This membrane surface area is realized by using a bundle of about 150 capillary membranes with an outside diameter of about 1.2 mm and an inside diameter of about 0.7 mm. In practice this number can vary from 100–200 and, depending on the number of capillary membranes used, the length of the membranes should be chosen in between 30 and 15 cm.

The water which is cleaned by the ultrafiltration device is free from contamination and pathogenes, like bacteria and viruses. The result is reliable drinking water which is free from any unpleasant smell and taste, which would result when, for instance, chlorine is added to the water. The ultrafiltration device has a long life span and can be cleaned and re-used. The ultrafiltration device according to the invention may be fitted as a component in a water tap, but it is also conceivable to connect the ultrafiltration device by means of, for instance, a screw or bayonet fitting to the water tap, in which case the ultrafiltration device also serves as the flow tube of the water tap. It is also possible to insert the ultrafiltration device in the water supply mains of a building, like a house. Obviously, in this case the dimensions of the ultrafiltration device should be adjusted.

Figure 4:
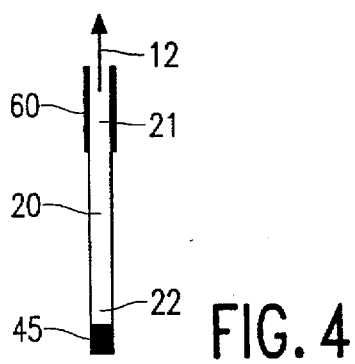
FIG. 4 shows a single capillary membrane according to the invention.

FIG. 4 shows a single capillary ultrafiltration membrane 20 according to the invention. At the side 22 the capillary is closed by, for instance, a resin, like epoxy or polyurethane. The end 21 is over a length of approximately 8 cm covered with a pore closing material 60, like a resin or tape. This membrane can be used as a straw to suck up water; the asymmetric pore structure in the membrane then again acts as a barrier for contamination and pathogenes. In this case the portion of the capillary at the closed end 22 is put into the water including a part of the pore closing section. If one sucks at the open end 21, the water will pass the membrane from the outside to the inside and thus filtered water will become available. The larger pores are in this case located at the outside of the capillary membrane. In this application the capillary has a length of about 20–30 cm, an outside diameter of about 5 mm and an inside diameter of about 3 mm.

The invention should not be considered as being restricted to the above mentioned preferred embodiments. The ultrafiltration device can be realized in various embodiments, which all lie within the scope of protection of the invention as specified in the claims. It is possible, for instance, to exchange the inlet and outlet connection in the embodiments shown in FIGS. 1, 2 and 3; the asymmetric structure of the membranes is in this case taken such that the larger pores are at the outside of the capillary membranes.

What is claimed is:

1. An ultrafiltration device for domestic/drinking water purification including a filter housing comprising:

an inlet and an outlet connection and a bundle of tubular capillary ultrafiltration membranes fitted in the filter housing, the capillary membranes being permanently hydrophilic, whereby the capillary membranes are open at a first inlet end and sealed at the other end and are, at the first end, held in a membrane holder which closes off the space in between the capillary membranes and the filter housing wherein the capillary ultrafiltration membranes have an asymmetric pore structure and the pore size of the membranes decreases in the direction of the liquid flow.

2. Ultrafiltration device for domestic/drinking water purification according to claim 1, whereby the membrane holder (30) consists of a resin which has been brought into the filter housing (10) over a restricted length and in which the capillary membranes (20) are embedded.

3. Ultrafiltration device for domestic/drinking water purification according to claim 2, whereby the resin is epoxy or polyurethane.

4. Ultrafiltration device for domestic/drinking water purification according to claim 2, whereby the resin is epoxy or polyurethane.

5. Ultrafiltration device for domestic/drinking water purification according to claim 1, whereby the capillary membranes (20) at the second end (22) are embedded in a resin which has been brought into the filter housing (10) over a restricted length.

6. Water supply provided with an ultrafiltration device according to claim 1, whereby the device is placed in the outlet-opening of the supply.

7. The water supply according to claim 6, wherein the outlet-opening is a mixing tap.

* * * * *